United States Patent [19]

Franchini et al.

[11] 4,289,185
[45] Sep. 15, 1981

[54] VEHICLE TIRES HAVING A REMOVABLE TREAD

[75] Inventors: Carlo Franchini; Luigi Maiocchi, both of Milan, Italy

[73] Assignee: Industrie Pirelli S.p.A., Milan, Italy

[21] Appl. No.: 962,670

[22] Filed: Nov. 21, 1978

[30] Foreign Application Priority Data

Dec. 23, 1977 [IT] Italy .............................. 31171 A/77

[51] Int. Cl.³ .............................................. B60C 9/00
[52] U.S. Cl. .............................. 152/361 DM; 152/176; 152/188
[58] Field of Search ............... 152/175, 176, 187, 188, 152/361 R, 361 PP, 361 DM, 354 R

[56] References Cited

U.S. PATENT DOCUMENTS

| | | | |
|---|---|---|---|
| 2,985,214 | 5/1961 | Lugli | 152/176 |
| 3,224,482 | 12/1965 | Barassi et al. | 152/176 |
| 3,474,848 | 10/1969 | Maiocchi | 152/176 |
| 3,606,921 | 9/1971 | Grawey | 152/361 R X |
| 3,750,733 | 8/1973 | Brewer | 152/175 |
| 3,789,898 | 2/1974 | Montagne | 152/209 R |
| 3,821,977 | 7/1974 | Yamagishi et al. | 152/175 X |
| 3,921,692 | 11/1975 | Oyoun | 152/361 R X |

FOREIGN PATENT DOCUMENTS

808824  2/1959  United Kingdom ................ 152/361

Primary Examiner—William A. Powell
Assistant Examiner—Thomas Bokan
Attorney, Agent, or Firm—Stevens, Davis, Miller & Mosher

[57] ABSTRACT

A pneumatic tire for a motor vehicle has a removable tread fastened to the casing by annular projections on one locked in annular grooves in the other when the tire is inflated. The tread is supported by a breaker structure underlying the tread in the crown portion of the casing. The breaker has an annular strip of metallic fabric and an annular tape of metallic fabric on each side of the strip and between the annular strip and underlying carcass. There is a free annular central zone between the tapes astride the center plane of the tire.

7 Claims, 1 Drawing Figure

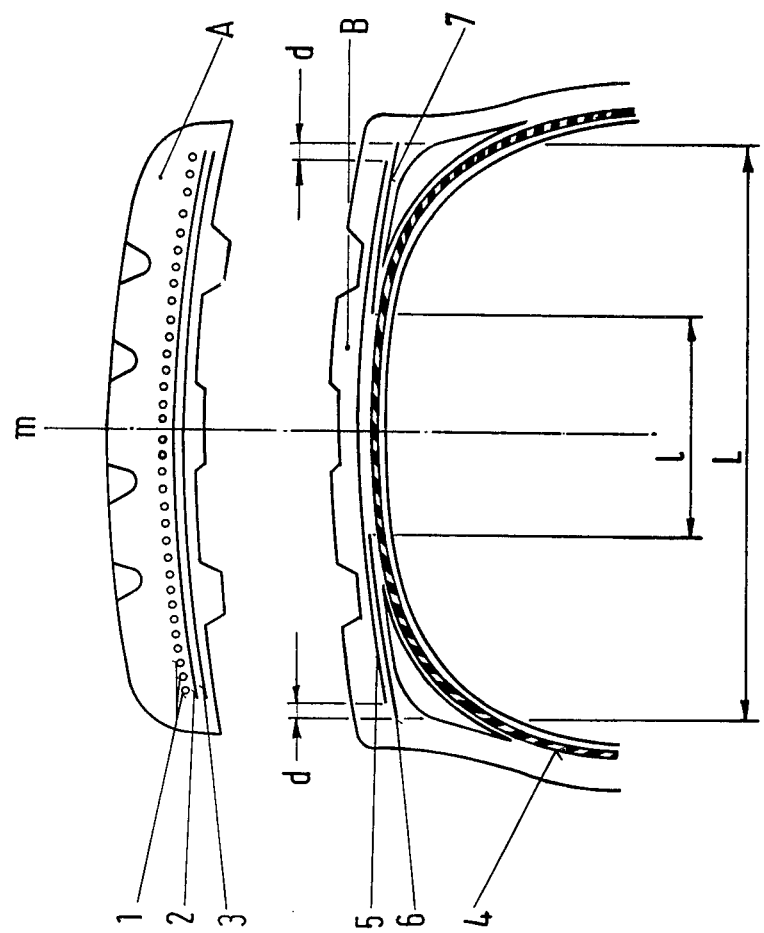

VEHICLE TIRES HAVING A REMOVABLE TREAD

This invention relates generally to tires for motor vehicle wheels and, more particularly, to such tires provided with removable tire treads, i.e. to vehicle tires having a casing and a tread in which a tread ring is attached to the casing by friction forces between the casing and tread ring generated by inflation of the casing.

The general structure of tires of this type has been disclosed in patents of the assignee of this application. The tread ring of such tires is provided with an annular reinforcing structure which has a critical influence on the behavior of the finished tire.

The tread ring first of all has a circumferentially inextensible metallic armor formed by a helically wound metal cord or wire. The coils of the wire are arranged in a direction which is substantially parallel to the longitudinal direction of the tread. The armor opposes expansion of the carcass when the tire is built up, originating therefore between the tread ring and the carcass of the tire the friction forces which secure the two elements together.

Moreover, the tread ring has at least two additional strips of metallic fabric having cords which are parallel to one another in each strip and cross the meridian plane of the tire at angles which vary according to the particular type of structure desired. These additional strips, which can take different positions with respect to the armor depending upon the peculiar characteristics desired in the tire, cooperate substantially to impart to the tire the transverse rigidity necessary for good road holding, both while running on a straight away or during cornering.

The tread ring is applied to a carrying casing which has always such dimensions that, if it were inflated without the corresponding ring, it would have an outer diameter greater than the inner diameter of the tread ring. In this way, when the complete tire is in an inflated condition, it is forced inside the circumferentially inextensible tread ring, as explained above. Also, the casing is provided with a breaker structure disposed in a radially outer position with respect to the carcass plies and generally has two or more strips of metallic fabric, the cords of each strip being parallel to one another but crossed with those of the other strips at angles, of, for instance, 65° with respect to the meridian plane of the tire.

This breaker structure is very important because it affects the behavior of such tires on the road. In fact, at least two essential characteristics, namely the distribution diagram of the specific pressure, consequent to the friction force, on the radially inner surface of the tread ring, and the lateral stability of the tire, are dependent upon it.

It is in fact evident that, however compact the ring/casing unit may be during use, it can never be compared to a unitary tire in which all of the component parts of the tire are joined as a unit during curing to create a tire having well defined and specific behavior characteristics.

On the contrary, the tire according to the present invention, even in the event, not reached until now, of a perfect compactness between the tread ring and the casing always acts as two distinct elements whose general behavior characteristics are the sum of the specific characteristics of each of the elements and depend, moreover, on the mutual action of these elements resulting from their assembly.

In connection with the lateral stability, it is known that the radial carcasses, i.e. those carcasses in which the cords of the carcass plies lie in meridian planes or form small angles with these planes have a poor lateral stability and require therefore a breaker structure capable of stiffening them transversally without also increasing the stiffening too much in order not to lose other necessary features. The radial carcass is the one normally used with the removable treads.

In particular, a breaker structure is needed, which is able to stiffen the carcass without increasing its diameter and does not reduce or modify the specific contact pressures between the carcass and the inside of the tread ring.

In fact, low contact pressures or variations in pressure between the various zones of the tire prevent effective sealing of the carcass to the ring resulting in bad travelling behavior and relative movements between the carcass and the tread ring under the impression area, which movements damage the contacting surfaces of the tread and casing and make the carcass of no use for later substitutions of the new tread ring.

These phenomena are even more serious with carcasses having only one metallic ply because these carcasses are more yieldable laterally and have therefore to be well stabilized by means of a strong metallic breaker.

It has been found that when a metallic carcass is used, the usual breaker structures formed of two crossed metallic strips stop the increase in the diameter of the carcass so that the carcass and the tread ring are not firmly fastened together. On the other hand, only one strip does not provide sufficient transverse rigidity for the tire to have good driving characteristics.

So, an object of the present invention is to provide a breaker structure for the casing of a vehicle tire which has a removable tread which breaker structure makes it possible to obtain specific uniform pressures on the radially inner surface of the tread ring which prevent any relative movement between the tread ring and the casing without adversely affecting the behavior characteristics of the tire. Another object of the invention is to provide a motor vehicle tire having a removable tread secured to the tire casing which is devoid of the disadvantages of the prior art tires of this type.

Other objects will become apparent from the following description with reference to the accompanying drawing which is an exploded view illustrating an embodiment of a tire tread and casing of the invention.

Accordingly, the foregoing objects of the invention are accomplished by providing a tire for a vehicle wheel having (1) a removable tread ring which is provided with a circumferentially inextensible annular reinforcing structure which has substantially the same width as the tread ring and (2) a tire casing having a metallic radial carcass capable of supporting the tread ring in a radially outer position. The tread ring is centered with respect to the center plane of the carcass and is locked in that position by the inflation pressure in the casing. The casing is provided with a breaker structure arranged in a radially outer position with respect to the carcass which comprises at least one strip of metallic fabric which is arranged astride the center plane and is substantially as wide as the annular reinforcing structure of the tread ring. All of the cords of the strip of metallic fabric are parallel to one another and are inclined in a certain sense with respect to the circumferential direction of the tire. The breaker structure also has two tapes of metallic fabric arranged along the lateral edges of the strip of metallic fabric. The axially outer edges of the two tapes are substantially coincident with the axially outer edges of the strip so as to leave free, between the axially inner edges of the tapes, a central zone centered with respect to the center plane of the casing. The cords of the tapes are parallel to one another in each tape and are inclined in the same sense with respect to the circumferential direction of the tire, but in an opposite sense with respect to the direction of the cords of the metallic fabric strip.

It has been ascertained surprisingly that the above described breaker structure solves the problem of relative movement between the tread ring and the carcass and avoids one of the reasons of non-serviceability of the prior art casings of this type while the behavior, life and resistance of such tires are not adversely affected and in many instances are improved by the invention.

It is believed that this might be due to the different effects of the centrifugal force along the radially outer profile of the casing because of the presence of the tapes, which compensate for differences of opposite sign related to the usual structure of the carcasses containing one metal ply, therefore providing for uniform distribution of the specific pressures on the whole radially inner surface of the tread ring so as to effectively anchor the tread ring to the casing when the tire is in use, but the applicants do not want to be bound by such an explanation.

According to a series of manufactured prototypes which have given particularly favorable results, the axial width of the free central zone, namely that between the two tapes, may vary between 8% and 69% of the maximum width of the breaker structure considered in its whole.

The outer edges of the tapes can be axially outer or axially inner with respect to the corresponding edges of the strip. The axial distance between each pair of the corresponding edges is of the order of the conventional values adopted in tire technology for the graduation of these elements, usually on the order of 10 to 15 mm.

The cords of the strip and of the tapes are inclined with respect to the circumferential direction of the tire at an angle between 45° and 80°. It is then essential that, the cords of the strip be inclined in a sense opposite to that of the cords of the tapes. The cords of the tapes, however, can be inclined at angles different from one another, and in that case it is advisable for the difference between the angles of inclination of the cords of the tapes not to exceed 30°.

The cords of the tapes can be the same as those used for the strip, or can have a tensile strength or an ultimate elongation, or physical and geometrical characteristics different from those of the strip, and also the density of the cords in the tapes can be different from that of the cords of the strip.

Referring now to the non-restrictive example of the drawing which illustrates a straight radial section of the tire bring into evidence the component structural elements of the tire of the invention, the tire having a removable tread having two component elements, namely the tread ring A and the casing B, which are represented separately, but which are assembled together for use by disposing the ring A on the carcass B. The tread and surface of the casing have a coupling profile comprising projections and grooves to anchor the tread ring on the casing. The projections and grooves form the components of an annular joint similar to a tongue and groove joint.

The circumferentially inextensible annular reinforcing structure of the tread ring is formed in a conventional manner by a plurality of metallic coils 1 obtained by winding up helically a metallic cord or wire in a circumferential direction with respect to the tire. In a radially inner position with respect to this structure, provision is made of two strips 2 and 3 of metallic fabric, the cords of which, parallel to one another in each strip, are respectively crossed at an angle varying from 5° to 30° with respect to the circumferential direction of the ring.

It is not necessary to described this ring in more detail since it, inter alia, does not constitute the subject matter of the present invention.

Coming now to the casing B, it has a radial carcass formed by only one ply of metallic cords 4, onto which, in a radially outer position and centered with respect to the center plane "m" of the casing, there is a breaker structure capable of imparting to the tire, in the best grade, the above indicated behavior characteristics regarding road holding, transverse rigidity, steering response, comfort and the like. This breaker structure comprises a strip 5 of metallic fabric, substantially as wide as the tread, that is as the annular reinforcing structure of the tread ring A. In a radially inner position with respect to strip 5, but externally of the carcass ply 4, and along the sides of strip 5, there are two tapes 6 and 7 of metallic fabric, arranged in such a way as to delimit between their axially inner edges a central zone, which will be called "free", centered astride the center plane of the tire.

Tests carried out on prototypes have demonstrated that, for good behavior of the tire, this free central zone must have an axial width "1" not smaller than 8% and not greater than 69% of the maximum width "L" of the above described breaker structure.

The lateral edges of the tapes 6 and 7 must coincide, substantially, with the corresponding edges of the strip 5. In other words, the axial distance "d" between the corresponding edges is that of the usual distance for such structures, namely on the order of 10 to 15 mm.

The graduation can be both external and internal, namely the strip 5 can protrude axially outside with respect to the underlying tapes or, vice versa, can have its edges in axially inner positions with respect to the corresponding edges of the tapes.

The above described structure permits some alternative embodiments which are not expressly illustrated here, because they are easily deducible in the light of the attached figure and of the relative description.

First of all, the two tapes 6 and 7 have been represented in a radially inner position with respect to the strip 5; however, they can also be situated in a radially outer position with respect to said strip, of course in compliance with the above indicated provisions concerning the width of the central zone and the graduation of the edges.

The cords of the strip 5 are inclined in a certain sense, with respect to the circumferential direction of the tire, at an angle ranging between 45° and 80°; the cords of the tapes are inclined, in an opposite sense with respect to said circumferential direction, at an angle ranging between 45° and 80°, too.

However, not only is it not essential for the inclination angles of the cords of the strip and of the tapes, respectively, to be identical, namely for the cords to be symmetrically arranged with respect to the circumferential direction of the tire, but it is not even required for the two tapes, to have equal inclination angles with respect to the circumferential direction.

In other words, the cords of the two tapes, parallel to one another in each tape, can be differently inclined with respect to the circumferential direction of the tire, provided that they are always arranged in opposite senses with respect to the inclination of the cords of the strip 5. In that case, however, it is advisable for the difference between the inclination angles of the two tapes not to exceed 30°.

As regards the cords of the tapes, in comparison with those of the strip 5, several solutions are possible.

First of all, they can be identical to one another or may have a different formation and structure, maintaining however the same tensile strength and/or the same elongation.

Moreover, it is possible to use cords for the tapes which are of different tensile strengths in the same resistant section, or a different stiffness, or simply a different diameter or a different ultimate elongation. In those cases, it is convenient for the cords of higher tensile strength or stiffness to be used for the tapes. In particular, favorable results have been obtained by using a breaker in which the cords of the strip 5 are cords having an ultimate elongation between 4% and 8%, usually known as "High Elongation" type cords whilst that used for tapes 6 and 7 are the usual type cords having an ultimate elongation of about 3%.

In addition to any of the above indicated variations, the density of the cords in the tapes can be different, and in particular, it can be greater than the corresponding density of the cords of the strip 5.

Of course, it is evident that the best results will be achieved by means of a careful selection and combination of each of the above illustrated structural characteristics, evaluating for each of them, in relation with the features of the other elements constituting the tire, which is their final effect on the finished tire in use.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A vehicle tire having a removable tread comprising a tread ring provided with a circumferentially inextensible annular reinforcing structure having substantially the same width as said tread ring, and a casing with a radial metallic carcass, said casing supporting said tread ring in a radially outer position and maintaining the tread in its position centered with respect to the center plane of the carcass when the casing is under inflation pressure, said casing being provided with an annular breaker structure arranged in a radially outer position with respect to the carcass and being characterized in that said breaker structure comprises only one strip of metallic fabric arranged astride said center plane and substantially as wide as said annular reinforcing structure of the tread ring, the cords of said strip being all parallel to one another and inclined in a predetermined sense with respect to the circumferential direction of the tire at an angle ranging between 45° and 80°, and two tapes of metallic fabric, arranged with one at each lateral part of said strip, the axially outer edges of said tapes being substantially coincident with the axially outer edges of said strip to thereby leave free, between their axially inner edges, a central zone centered with respect to the center plane of the casing of a width between 8% and 69% of the maximum width of said breaker structure, the cords of said tapes being parallel to one another in each tape and being inclined at the same angle with respect to the circumferential direction of the tire, but in opposite senses with respect to the direction of the cords of said strip at an angle ranging between 45° and 80° with respect to the circumferential direction of the tire.

2. The tire of claim 1 characterized in that the axially outer edges of the tapes are externally graduated with respect to the corresponding edges of said strip.

3. The tire of claim 1 characterized in that the axially outer edges of the tapes are internally graduated with respect to the corresponding edges of said strip.

4. The tire of claim 1 characterized in that the cords of the tapes are inclined with respect to the circumferential direction of the tire at angles which are different for each tape.

5. The tire of claim 4 characterized in that the difference in the inclination values of the cords of said tapes with respect to the circumferential direction of the tire does not exceed 30°.

6. The tire of claim 1 characterized in that the densities of the cords in the strip and in the tapes, respectively, are different.

7. The tire of claim 1 characterized in that the cords of the strip have an ultimate elongation between 4% and 8%.

* * * * *